Oct. 4, 1932.　　　E. A. ROBERTS　　　1,880,489

PNEUMATIC TIRE CONSTRUCTION

Filed July 24, 1931

Eugene A. Roberts, INVENTOR

BY

ATTORNEYS

Patented Oct. 4, 1932

1,880,489

UNITED STATES PATENT OFFICE

EUGENE A. ROBERTS, OF AKRON, OHIO, ASSIGNOR TO THE FIRESTONE TIRE & RUBBER COMPANY, OF AKRON, OHIO, A CORPORATION OF OHIO

PNEUMATIC TIRE CONSTRUCTION

Application filed July 24, 1931. Serial No. 552,825.

This invention relates to pneumatic tire construction, and more especially it relates to improved construction at the bead portions of pneumatic tires, particularly the toes of said bead portions, in pneumatic tires used on drop center rims.

In pneumatic tires used on drop center rims the usual flap is dispensed with, and the toe portions of the tire beads are formed with flexible extensions of rubber designed to prevent the pinching of inner tubes between the tire beads and the bead seats of the rim. These flexible extensions or toes are subjected to severe treatment during the mounting and removal of the tires from rims, and frequently are mutilated or torn from the tire.

The chief objects of this invention are to provide pneumatic tire casings with flexible bead toes or tips which will not readily be mutilated; and which will not readily separate or pull off from the tire beads. In general the invention aims to provide a superior tire casing for use on drop center rims.

Figure 1:
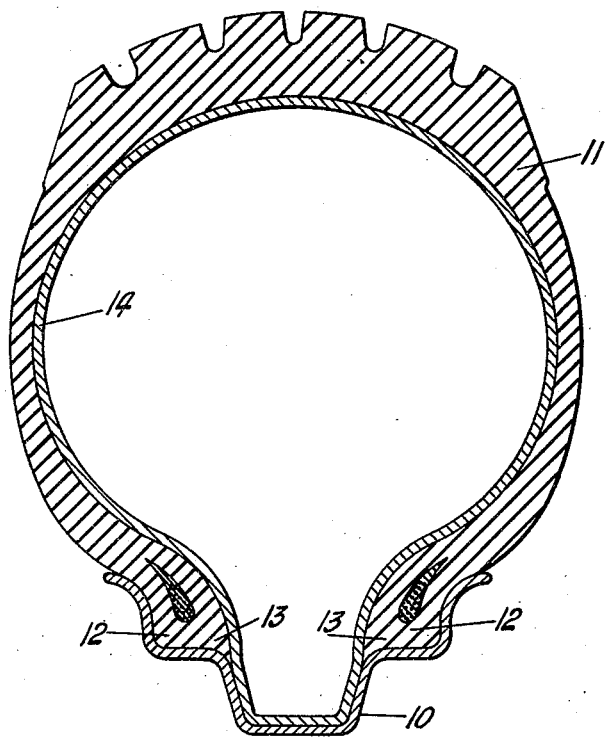
Figure 2:
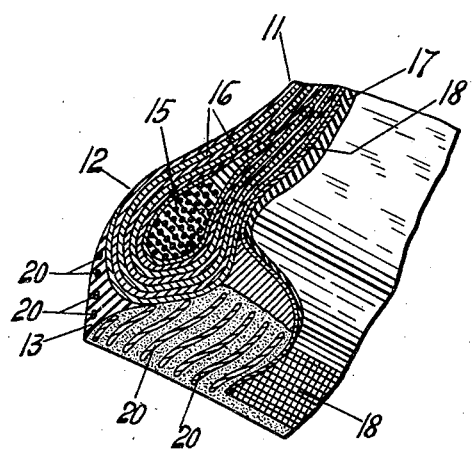

Of the accompanying drawing:

Figure 1 is a cross section of a pneumatic tire casing embodying the invention, and an inner tube and drop center rim in operative association therewith; and Figure 2 is an enlarged, fragmentary, sectional perspective view of a bead portion of a tire embodying the invention, showing details of construction.

Referring to the drawing, 10 is a drop center rim of the usual construction, 11 is a tire casing mounted thereon having bead portions 12, 12 that are formed on their adjacent edges with flexible tips or toes 13, 13, and 14 is the usual distensible inner tube in the tire.

Referring particularly to Figure 2 of the drawing, a bead portion 12 of usual construction is shown comprising an inextensible bead core 15, fabric plies 16, 16 of rubberized weftless or weak-wefted cords thereabout, rubber sidewall 17, and a chafer strip 18 of square woven fabric that extends substantially across the bottom or inner periphery of the bead and covers the back or outer face thereof. The flexible toe or tip 13 preferably is composed of tough rubber composition, preferably tread stock, and is reinforced by obliquely disposed parallel cords 20, 20 that are laterally spaced apart somewhat farther than the cords of the fabric plies 16, the cords 20 constituting cord fabric such as is used for cord fabric breaker strips.

The cord strands 20 extend substantially to the apex or corner of the tip 13, the inner ends of the respective strands extending onto the inner face of the bead portion 12, and the outer end portions of the strands extending across the bottom of the bead substantially to the heel thereof, between the chafer strip 18 and the outer fabric ply 16.

The reinforcing strands 20 being open or spaced apart are completely surrounded and isolated from each other by the rubber composition of the tip 13 so that separation of the rubber and reinforcement is prevented. The reinforcing strands function in a manner similar to the breaker fabric under the tread of a tire, taking the strains of mounting or dismounting a tire instead of transmitting said strains to the chafer strip or fabric plies.

The feature of positioning the outer ends of the reinforcing strands 20 between the chafer 18 and outer ply 16 provides an effective permanent anchorage for said strands. It also permits the use of tread stock for the flexible tip, such stock not being desirable on the outer face of the bead but being permissibly used between the chafer strip and outer fabric ply.

The invention provides a superior tire construction for tires used on drop center rims. The construction shown and described is susceptible to modification within the scope of the appended claims without departing from the spirit of the invention.

What is claimed is:

1. A pneumatic tire casing having flexible rubber tips on the toes of its beads, and reinforcing means embedded in said rubber tip and extending along the bottom of the bead to the tip and then partially up the inner side of the tire casing, said reinforcing consisting of obliquely disposed, parallel cord strands.

2. A pneumatic tire comprising a carcass of rubberized cord fabric and having flexible rubber tips on the toes of its beads, and reinforcing in said tips consisting of cord fabric of relatively widely spaced strands as compared to the fabric of the carcass.

3. A pneumatic tire casing comprising flexible rubber tips on the toes of its beads, chafer strips upon the inner periphery of said beads, and fabric reinforcement in said flexible tips anchored between the chafer strips and the tire carcass.

4. A pneumatic tire casing comprising a fabric carcass and chafer strips on the beads thereof, and flexible tips on the toes of the said beads, said tips comprising reinforcements of oblique, parallel, cord strands having one of their ends disposed between a chafer strip and the carcass.

5. A pneumatic tire casing comprising a carcass of cord fabric, chafer strips on the beads thereof, flexible rubber tips on the toes of said beads, and reinforcement in said tips consisting of bias-laid cord fabric having the cords thereof relatively widely spaced as compared to the fabric of the carcass, one marginal portion of the said reinforcements being positioned between the chafer strips and the carcass.

In witness whereof, I have hereunto affixed my signature this 30th day of June, 1931.

EUGENE A. ROBERTS